Figure 2:
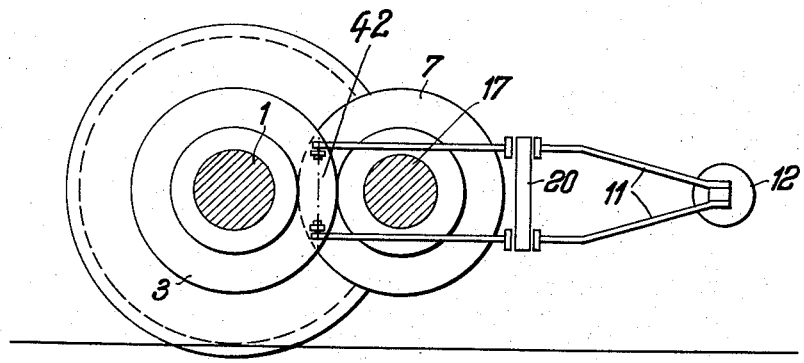

April 28, 1959     K. TRUEMPER     2,884,096
BRAKING ARRANGEMENT
Filed Sept. 13, 1956

Inventor:
Konrad Truemper
by: Michael S. Striker
ag

United States Patent Office 2,884,096
Patented Apr. 28, 1959

2,884,096

BRAKING ARRANGEMENT

Konrad Truemper, Siegen, Westphalia, Germany, assignor to Rheinstahl Siegener Eisenbahnbedarf Aktiengesellschaft Application September 13, 1956, Serial No. 609,725

Claims priority, application Germany September 14, 1955

9 Claims. (Cl. 188—80)

The present invention relates to a braking arrangement, and more particularly to a braking arrangement of the type in which a plurality of friction discs is used.

Braking arrangements are known in which friction discs are pressed against a stationary friction surface.

When the braking arrangements according to the prior art are operated at high loads or at high speed, great amounts of heat are created which frequently cannot be conducted away rapidly enough from the stationary friction surface. Modern railway cars and motor cars require small brakes and consequently, it is necessary to reduce the friction surface and the size of the stationary brake member whereby it becomes even more difficult to prevent over heating of the brakes.

It is one object of the present invention to overcome the disadvantages of the known braking arrangements, and to provide a braking arrangement which will not overheat even under a great load and at high speed.

It is another object of the present invention to provide a braking arrangement in which all brake means move so that the heat developed during the braking operation is rapidly carried away by the surrounding air.

It is a further object of the present invention to provide a braking arrangement in which two brake means engage each other with continuously changing brake surface portions.

It is a further object of the present invention to provide a brake arrangement including two relatively movable brake means having operative brake surface portions moving in opposite directions.

It is a further object of the present invention to provide a braking arrangement in which two brake means are held in a braking position frictionally engaging each other without producing any axial force acting on the brake supports, or on a vehicle on which the brake supports are mounted.

With these objects in view, the present invention mainly consists in a braking arrangement which comprises, in combination first rotary brake means adapted to be connected to a rotary element to be braked, second rotary brake means supported for movement between a braking position engaging the first rotary brake means and an inoperative position, transmission means connecting the first and second brake means for simultaneous rotation in a sense causing movement of the engaging portions of the first and second brake means in opposite directions, and actuating means for moving the first and second brake means into a braking position frictionally engaging each other.

According to the preferred embodiment of the present invention, each brake means includes a set of friction discs. Each set of friction discs is connected to the respective shaft for rotation therewith, and is movable on the same in axial direction. The two sets of friction discs overlap in a braking area, and since the two shafts and the two sets of friction discs rotate in the same direction of rotation, the overlapping portions of the two sets of friction discs move in opposite directions at a comparatively high relative speed.

The two shafts preferably rotate at slightly different rotary speeds so that the portions at which the two sets of friction discs engage each other are continuously changed for preventing excessive wear on one part of the friction disc surface.

Figure 1:
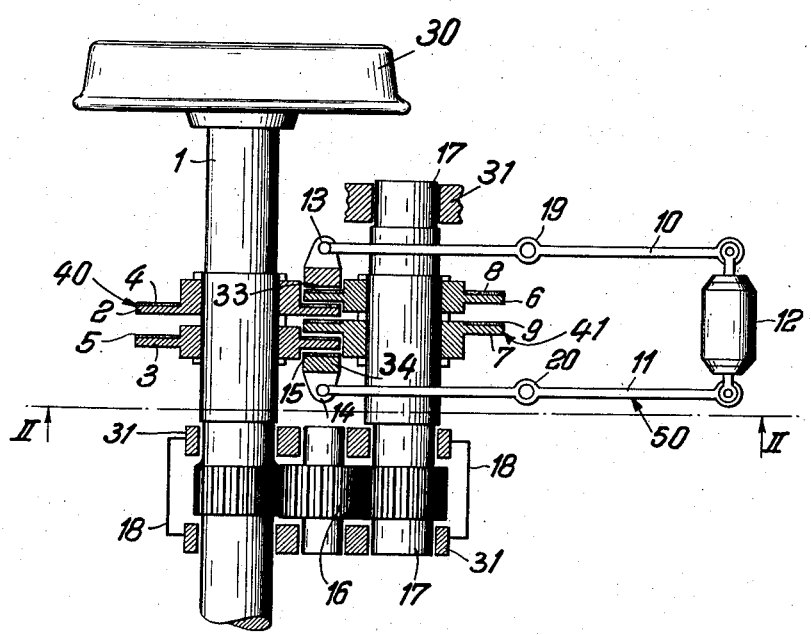

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1 is a fragmentary axial sectional view of a preferred embodiment of the present invention; and Figure 2 is a cross-sectional view taken on line II—II in Figure 1.

Referring now to the drawings, a first shaft 1 is connected to an element which is to be braked illustrated to be the wheel 30. Shaft 1 is connected by transmission means 18 including meshing gears 16, to a second shaft 17. Shafts 1 and 17 are mounted for rotation in suitable bearings 31. Since three gears 16 are provided, shaft 17 rotates in the same direction of rotation as shaft 1. Preferably, however, the transmission 18 is so constructed that the rotary speed of shaft 17 is slightly different from the rotary speed of shaft 1.

First brake means 40 are mounted on shaft 1 in such a manner that the first brake means 40 turn together with shaft 1, but are axially movable on the same. Second brake means 41 are mounted in a similar manner on shaft 17 and are movable in axial direction while being connected to shaft 17 for rotation. In the illustrated embodiment, each of the first and second brake means includes a set of friction discs. The brake means 40 include two friction discs 2 and 3, and the brake means 41 include two friction discs 6 and 7. Brake linings 4 and 5 are fixed to one side of the friction discs 2 and 3, and brake linings 8 and 9 are fixed on one side of friction discs 6 and 7. The other side of each friction disc is smooth and constitutes a braking face cooperating with the lining of another friction disc.

Shafts 1 and 17 are parallel to each other, and spaced such a distance that the two sets of friction discs overlap as best seen in Figure 2. Portions of the braking faces of the two sets of discs overlap in a braking area which is bounded on one side by the peripheries of the first set of friction discs 40 and bounded on the other side by the peripheries of the second set of friction discs 41. Actuating means 50 are provided for moving the two sets of friction discs 40 and 41 between an inoperative position in which the respective braking faces are spaced from each other, and a braking position in which the overlapping portions of the friction discs engage each other in the braking area 42.

The actuating means 50 include a pair of brake shoes 13 and 14, a pair of operating levers 10 and 11, and a servo-motor 12. Each of the brake shoes 13 and 14 has a face located opposite the face of the other brake shoe, and the overlapping portions of the friction discs are located between the opposite faces 33 and 34. A brake lining 15 is fixed to the face 34, so that the brake lining 15 is located opposite the smooth face of the friction disc 3 whereas the smooth face 33 of brake shoe 13 is located opposite the lining 8 on the friction disc 6.

Each brake shoe is pivotally connected to one of the operating levers 10 and 11 which are mounted for pivotal movement about pins 19 and 20. The other ends of the operating levers 10 and 11 are connected to the piston rods of the servo-motor 12, so that operation of the servo-motor 12 will pivot the operating levers 10 and 11 and move the brake shoes 13 and 14 toward each other.

The faces 33 and 34, and also the brake lining 15 on face 34 have the same shape as the braking area 42 which is best seen in Figure 2.

The braking arrangement according to the present invention is operated in the following manner:

When the servo-motor 12 is operated, the brake shoes 13 and 14 press the two sets of friction discs 40 and 41 against each other, so that the friction discs engage each other along the overlapping portions thereof, while the outermost friction discs 3 and 6 are frictionally engaged by the braking face 33 and by the lining 15. Since the friction discs of each set of friction discs are moved toward each other by the opposite brake shoes 13 and 14, no axial force is exerted on the shafts 1 and 17, as would be necessary if one of the brake shoes were fixedly connected to one of the shafts. Consequently no axial force acts on the vehicle on which the arrangement is supported, or on any other support of the braking arrangement of the present invention.

Since the friction discs 40 and 41 turn in the same direction of rotation, the overlapping portions of the friction discs in the braking area 42 move in opposite directions, so that a very strong braking effect is obtained when the friction discs are pressed against each other in the braking area. In addition to the braking effect exerted by the two sets of friction discs 40 and 41, a braking effect is produced by the pair of brake shoes 13 and 14 which frictionally engage the outermost friction discs of the two sets of friction discs, and brake the same. Consequently, the actuating means 50 simultaneously serve for moving the two sets of friction discs to an engaging braking position, and for braking the shaft 1 by engaging outermost friction discs frictionally.

It will be noted that in the illustrated embodiment always a smooth braking surface cooperates with a brake lining whereby a particularly advantageous braking action is obtained. The same result could be obtained by providing only one set of friction discs with brake lining on both sides of each friction disc. If, for instance, all friction discs 41 are provided with brake linings on both sides and the friction discs 40 have no brake linings, a smooth braking surface will again cooperate with a brake lining.

In the event, for example, three friction discs 41 are provided, and that such friction discs have brake linings on both sides thereof, the faces 33 and 34 of the brake shoes 13 and 14 need not be provided with a brake lining 15. However, if the outermost friction discs belonging to the same set of friction discs have only smooth braking faces, it will be necessary to provide brake linings on both brake shoes 33 and 34.

It is also contemplated to provide only one friction disc on the shaft 1, and two friction discs on both sides thereof on shaft 17. In this event, it is not necessary to mount the friction disc on shaft 1 movable in axial direction, since a symmetrical distribution of force is obtained by the arrangement of the brake shoes 33 and 34.

In the event that the two shafts 1 and 17 rotate at the same rotary speed, the same overlapping portions of the two sets of friction discs will remain in frictional engagement in the area 42. Such arrangement would lead to excessive wear of only one portion of the friction discs. In accordance with the present invention, the transmission 18, and the gears 16, are so designed and constructed that the shaft 17 rotates at a rotary speed which is different from the rotary speed of shaft 1. Consequently the friction discs 41 turn relative to the friction discs 40, and different portions of the two sets of friction discs will assume the overlapping position in the area 42. Thereby, the friction discs are uniformly worn along the entire annular area of the friction faces.

From the above description of a preferred embodiment of the present invention it will become apparent that all elements of the braking arrangement of the present invention rotate and move in the surrounding air, so that the heat developed by the braking operation is rapidly removed by conduction and convection from the heated braking area 42. Consequently it is possible to design brakes of small size capable of braking a much greater load than the brakes according to the prior art, and moreover the brakes according to the present invention have a longer span of life since the heat developed by the braking operation is carried away before it can do any damage to the brake.

It will be understood that each of the elements described above, or two or more together, may also find a useful application in other types of braking arrangements differing from the types described above.

While the invention has been illustrated and described as embodied in a braking arrangement including two sets of rotary friction discs arranged in overlapping position, it is not intended to be limited to the details shown, since various modifications and structural changes may be made without departing in any way from the spirit of the present invention.

What is claimed as new and desired to be secured by Letters Patent is:

1. A braking arrangement comprising, in combination, a first shaft adapted to be connected to an element to be braked; first rotary brake means including a set of first friction discs mounted on said first shaft movable in axial direction and connected thereto for rotation therewith; a second shaft extending parallel to said first shaft; second rotary brake means including a set of second friction discs mounted on said shaft movable in axial direction and connected thereto for rotation therewith, said set of first friction discs projecting partly into the spaces between said second friction discs so that said first and second friction discs have portions overlapping in a braking area bounded on one side by the peripheries of said first friction discs and on the other side by the peripheries of said second friction discs; transmission means connecting said first and second shafts for simultaneous rotation in the same direction for causing in said braking area movement of said overlapping portions of said first and second friction discs in opposite directions; a pair of brake shoe means located on opposite sides of said first and second brake means, said pair of brake shoe means having a pair of opposite faces, said brake shoe means being movable between an inoperative position and a braking position in which said faces frictionally engage the outermost friction discs of said sets of first and second friction discs and urge the said first and second friction discs into a braking position in which said first and second friction discs frictionally engage each other in said braking area; and operating means for moving said pair of brake shoe means between said positions thereof.

2. A braking arrangement comprising, in combination, a first shaft adapted to be connected to an element to be braked; first rotary brake means including a set of first friction discs mounted on said first shaft movable in axial direction and connected thereto for rotation therewith; a second shaft extending parallel to said first shaft; second rotary brake means including a set of second friction discs mounted on said shaft movable in axial direction and connected thereto for rotation therewith, said set of first friction discs projecting partly into the spaces between said second friction discs so that said first and second friction discs have portions overlapping in a braking area bounded on one side by the peripheries of said second friction discs; transmission means connecting said first and second shafts for simultaneous rotation in the same direction for causing in said braking area movement of said overlapping portions of said first and second friction discs in opposite directions; a stationary support; a pair of operating levers pivotally mounted on said stationary support; a pair of brake shoes respectively mounted on said operating levers and having a pair of opposite faces located on opposite sides of said first and second brake means, said pair of braking levers being movable with said brake shoes between an inoperative position and a braking position in which said faces of said brake shoes frictionally engage said first and second brake means and urge the same to a braking position in which said first and second friction discs frictionally engage each other in said braking area; and servo-motor means for pivoting said operating levers for moving said brake shoes between said inoperative and braking positions whereby no force is exerted in axial direction on said first and second shafts.

3. A braking arrangement comprising, in combination, a first shaft adapted to be connected to an element to be braked; at least one first rotary brake disc having a first braking surface and being mounted on said first shaft connected thereto for rotation therewith; a second shaft parallel to said first shaft; at least one second rotary brake disc mounted on said second shaft connected thereto for rotation therewith and having a second braking surface overlapping said first brake surface, a portion of said second braking surface being located opposite a portion of said first braking surface, at least one of said brake discs being movable on the respective associated shaft in axial direction between an inoperative position in which said first and second braking surfaces are spaced, and a braking position in which said portions of said first and second braking surfaces frictionally engage each other; transmission means connecting said first and second shafts for simultaneous rotation in the same direction for causing movement of said portions of said braking surfaces in opposite directions; and actuating means for moving said one rotary brake disc in axial direction on the respective shaft into said braking positions.

4. A braking arrangement as set forth in claim 3 wherein said transmission means effect rotation of said shafts at different speeds.

5. A braking arrangement comprising, in combination, a first shaft adapted to be connected to an element to be braked; at least one first rotary brake disc having a first braking surface and being mounted on said first shaft connected thereto for rotation therewith; a second shaft parallel to said first shaft; at least one second rotary brake disc mounted on said second shaft connected thereto for rotation therewith and having a second braking surface overlapping said first brake surface, a portion of said second braking surface being located opposite a portion of said first braking surface, at least one of said brake discs being movable on the respective associated shaft in axial direction between an inoperative position in which said first and second braking surfaces are spaced, and a braking position in which said portions of said first and second braking surfaces frictionally engage each other; transmission means connecting said first and second shafts for simultaneous rotation in the same direction for causing movement of said portions of said braking surfaces in opposite directions; and brake shoe means movable in axial direction between an inoperative position and a position frictionally engaging said one brake disc for moving the same in axial direction into said braking position.

6. An arrangement as set forth in claim 5 wherein said first and second brake discs overlap in a braking area bounded by the peripheries of said brake discs, and wherein said brake shoe means having a braking surface engaging said one brake disc in the region of said braking area.

7. A braking arrangement as set forth in claim 5 and including two second rotary brake discs mounted on said second shaft on opposite sides of said first brake disc, wherein said two second brake discs are movable on said second shaft in axial direction between an inoperative position spaced from said first brake disc and a braking position frictionally engaging the same; and wherein said brake shoe means include a pair of brake shoes arranged on opposite sides of said second brake discs and being movable in axial direction between an inoperative position, and an operative position frictionally engaging said second rotary brake discs for moving the same in axial direction into said braking position engaging said first brake disc and for braking the same.

8. A braking arrangement comprising, in combination, first shaft means adapted to be connected to an element to be braked; first rotary brake disc means mounted on said first shaft means connected thereto for rotation therewith; second shaft means parallel to said first shaft means; second rotary brake disc means mounted on said second shaft means connected thereto for rotation therewith, said first and second rotary brake disc means overlapping each other, at least one of said brake disc means being movable on the respective associated shaft means in axial direction to a braking position in which said first and second brake disc means frictionally engage each other; transmission means connecting said first and second shaft means for simultaneous rotation in the same direction for causing movement of said first and second brake disc means in opposite direction; and means arranged on opposite sides of said brake disc means and being movable to a position engaging said brake disc means for moving said movable brake disc means in axial direction into said braking position and for braking said first shaft means.

9. A braking arrangement as set forth in claim 8 wherein said each of said brake disc means includes a plurality of brake discs, and a brake lining on each brake disc of at least one of said brake disc means adapted to engage a cooperating brake disc.

References Cited in the file of this patent
UNITED STATES PATENTS

| | | |
|---|---|---|
| 397,120 | Gilbert | Feb. 5, 1889 |
| 692,046 | Bischoff | Jan. 28, 1902 |
| 1,875,095 | Milan | Aug. 30, 1932 |
| 2,481,127 | Ledwinka | Sept. 6, 1949 |